(12) United States Patent
Abe et al.

(10) Patent No.: US 8,616,800 B2
(45) Date of Patent: Dec. 31, 2013

(54) BALL JOINT, AND BALL JOINT PRODUCTION METHOD

(75) Inventors: Masaki Abe, Kashiwara (JP); Hajime Watanabe, Kashiwara (JP)

(73) Assignee: JTEKT Corporation, Osaka (JP)

( * ) Notice: Subject to any disclaimer, the term of this patent is extended or adjusted under 35 U.S.C. 154(b) by 64 days.

(21) Appl. No.: 13/353,577

(22) Filed: Jan. 19, 2012

(65) Prior Publication Data

US 2012/0189375 A1    Jul. 26, 2012

(30) Foreign Application Priority Data

Jan. 25, 2011    (JP) ................................. 2011-013398

(51) Int. Cl.
F16C 11/06    (2006.01)
(52) U.S. Cl.
USPC ........................................................ 403/139
(58) Field of Classification Search
USPC ............. 403/57, 90, 122–124, 132, 135, 139; 464/8, 15
See application file for complete search history.

(56) References Cited

U.S. PATENT DOCUMENTS

| | | | | |
|---|---|---|---|---|
| 3,969,232 A | * | 7/1976 | Turner | 508/106 |
| 4,904,106 A | * | 2/1990 | Love | 403/135 |
| 6,015,775 A | * | 1/2000 | Takayama et al. | 508/103 |
| 7,588,384 B2 | * | 9/2009 | Yokohara | 403/135 |
| 8,061,921 B2 | * | 11/2011 | Seol et al. | 403/124 |
| 2006/0093246 A1 | * | 5/2006 | Akita et al. | 384/279 |
| 2007/0160426 A1 | | 7/2007 | Suda et al. | |
| 2009/0123097 A1 | | 5/2009 | Barlerin et al. | |

FOREIGN PATENT DOCUMENTS

| | | |
|---|---|---|
| CN | 1 904 400 A | 1/2007 |
| EP | 1 801 433 B1 | 4/2010 |
| JP | A-61-112813 | 5/1986 |
| JP | A-2003-262213 | 9/2003 |

OTHER PUBLICATIONS

European Search Report issued in Application No. 12152190.0; Dated Oct. 2, 2012.

* cited by examiner

Primary Examiner — Gregory Binda
Assistant Examiner — Josh Skroupa
(74) Attorney, Agent, or Firm — Oliff & Berridge, PLC

(57) ABSTRACT

A ball joint and production method thereof that ensure that grease retainers are provided on the entire contact surface of a resin sheet between an outer surface of a round head of a ball stud and the contact surface to properly maintain lubrication between the round head and the resin sheet. Graphite particles are dispersed over an inner surface of the resin sheet, and the resin sheet and the round head of the ball stud are inserted in a housing. An open end portion of a housing body is swaged to be reduced in diameter. The graphite particles are pressed against the inner surface of the resin sheet, whereby portions of the inner surface of the resin sheet against which the graphite particles abut are depressed. Thus, gaps are formed around the respective graphite particles. Grease enters the gaps, which each function as a grease retainer.

8 Claims, 8 Drawing Sheets

BALL JOINT, AND BALL JOINT PRODUCTION METHOD

BACKGROUND OF THE INVENTION

1. Field of the Invention

The present invention relates to a ball joint and a ball joint production method.

2. Description of the Related Art

JP-A-2003-262213, for example, discloses a ball joint which includes a metal ball stud having a round head provided at one end thereof, a synthetic resin sheet covering an outer surface of the round head, and a bottomed cylindrical housing accommodating the round head and the resin sheet. The ball stud is pivotal about the round head relative to the housing. The round head is slidable on an inner surface of the resin sheet, as the ball stud is pivoted. The inside of the housing is filled with grease (particularly, the grease is provided between the resin sheet and the round head).

In production of the ball joint, an open end portion of the housing (an end portion of the housing to be formed with an opening) is swaged inward so as to be reduced in diameter as compared with the other portion of the housing. Thus, the round head of the ball joint is prevented from being withdrawn from the housing, and the resin sheet is pressurized. During the swaging of the open end portion of the housing, the round head and the resin sheet are generally retained in the housing.

If lubrication between the outer surface of the round head and a contact surface (inner surface) of the resin sheet is impaired in the ball joint, the round head and the resin sheet are rubbed against each other, whereby the resin sheet is abraded. This may reduce the service life of the ball joint. Therefore, the lubrication between the round head and the resin sheet should be properly maintained.

The inventors of the present invention contemplate to provide (distribute) minute grease retainers defined between the contact surface of the resin sheet and the outer surface of the round head over the entire contact surface to provide a sufficient amount of grease between the round head and the resin sheet. A conceivable approach to this is to preliminarily provide a multiplicity of minute groves in the entire contact surface of the resin sheet for retaining the grease.

In the production of the ball joint, however, the resin sheet is pressed against the round head to be deformed, when the open end portion of the housing is swaged. Therefore, the minute grooves provided in the contact surface of the resin sheet are collapsed. Thus, the aforementioned approach fails to provide the grease retainers between the outer surface of the round head and the contact surface of the resin sheet.

SUMMARY OF THE INVENTION

It is therefore an object of the present invention to provide a ball joint and a ball joint production method which ensure that grease retainers can be provided between an outer surface of a round head and a contact surface of a resin sheet over the entire contact surface to properly maintain lubrication between the round head and the resin sheet.

The present invention provides a ball joint, which includes: a ball stud having a round head provided at one end thereof; a resin sheet having a contact surface in contact with an outer surface of the round head and covering the outer surface of the round head to slidably support the round head; a housing having an opening and accommodating the roundhead and the resin sheet; and grease provided between the outer surface of the round head and the contact surface of the resin sheet; wherein solid lubricant particles are present between the outer surface of the round head and the contact surface of the resin sheet; wherein the solid lubricant particles present between the outer surface of the round head and the contact surface of the resin sheet are pressed against the contact surface, whereby depressions are formed in and around portions of the contact surface abutting against the solid lubricant particles to form gaps around the solid lubricant particles for retaining the grease.

According to the present invention, the solid lubricant particles are present between the outer surface of the round head and the contact surface. The solid lubricant particles are pressed against the contact surface, whereby the depressions are formed in and around the portions of the contact surface abutting against the solid lubricant particles. Thus, the gaps are formed around the solid lubricant particles between the contact surface and the outer surface of the round head. Since the solid lubricant particles are present over the entire contact surface of the resin sheet between the contact surface of the resin sheet and the outer surface of the round head, the gaps are distributed over the entire contact surface. The grease is provided between the contact surface and the outer surface of the round head, so that the grease enters the gaps formed around the solid lubricant particles. Thus, the gaps each function as a grease retainer. Therefore, the grease retainers can be distributed over the entire contact surface of the resin sheet between the contact surface of the resin sheet and the outer surface of the round head. This makes it possible to properly maintain the lubrication between the round head and the resin sheet.

Further, the solid lubricant particles may be retained in the depressions. In this case, the solid lubricant particles are moved together with the resin sheet when the round head is moved (rotated) relative to the resin sheet after a part of the housing is swaged, because the solid lubricant particles are retained in the depressions. Since the depressions are fixedly provided in the contact surface of the resin sheet, the gaps can be stably provided which each function as a grease retainer.

The present production method includes: a solid lubricant dispersing step of dispersing solid lubricant particles over a contact surface of the resin sheet to be brought into contact with an outer surface of the round head; a grease feeding step of feeding grease between the outer surface of the round head and the contact surface; an inserting step of inserting the round head and the resin sheet in a housing having an opening with the outer surface of the round head being covered with the contact surface of the resin sheet after the solid lubricant dispersing step; and a swaging step of swaging an opening defining portion of the housing to reduce a diameter of the opening.

According to an inventive method, the solid lubricant particles can be provided between the outer surface of the round head and the contact surface and kept pressed against the contact surface, whereby the portions of the contact surface abutting against the solid lubricant particles are depressed to form the gaps around the solid lubricant particles between the outer surface of the roundhead and the contact surface. Since the solid lubricant particles are present over the entire contact surface of the resin sheet between the contact surface of the resin sheet and the outer surface of the round head, the gaps are distributed over the entire contact surface. The grease is present between the contact surface and the outer surface of the round head and, therefore, enters the gaps formed around the solid lubricant particles. Thus, the gaps each function as a grease retainer. Therefore, the grease retainers can be properly provided between the contact surface of the resin sheet and the outer surface of the round head. This makes it possible to properly maintain the lubrication between the round head and the resin sheet.

Further, the solid lubricant particles are dispersed over the contact surface of the resin sheet, and the resin sheet and the round head are inserted into the housing. Then, the opening defining portion of the housing is swaged. Thus, the solid lubricant particles can be provided between the outer surface of the round head and the contact surface, and kept pressed against the contact surface.

In the inventive method, only the step of dispersing the solid lubricant particles (solid lubricant dispersing step) is added to the conventional ball joint production method. This makes it possible to properly provide the grease retainers between the outer surface of the round head and the contact surface without significant increase in the number of process steps.

DETAILED DESCRIPTION OF EMBODIMENT

An embodiment of the present invention will hereinafter be described in detail with reference to the attached drawings.

Figure 1:
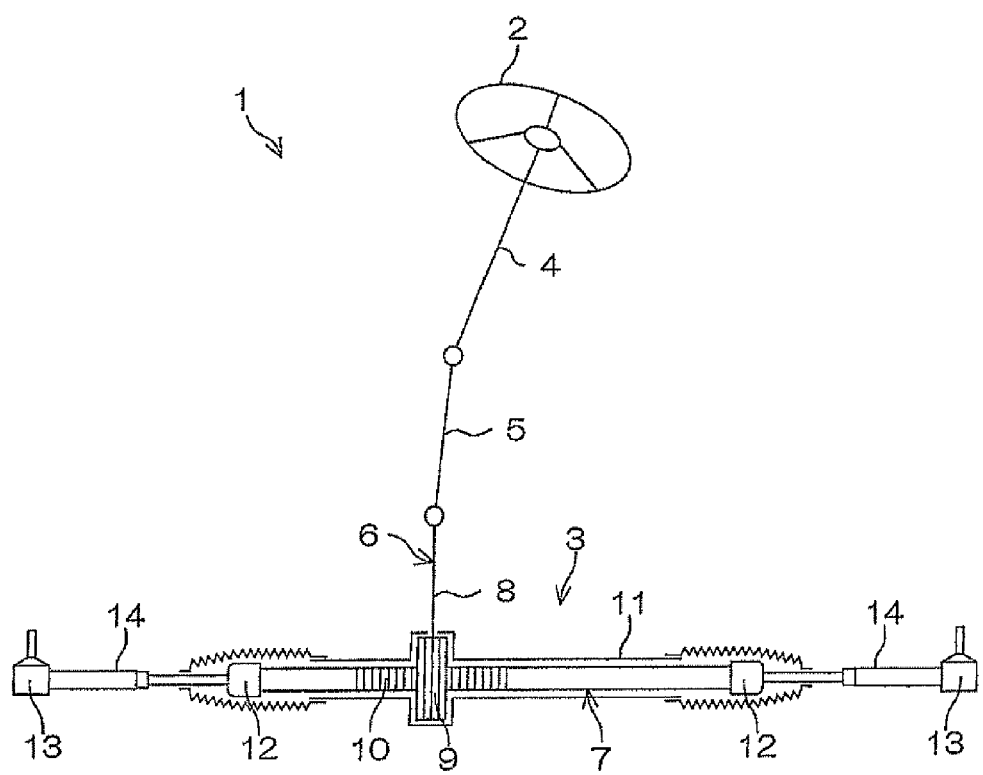
FIG. 1 is a schematic diagram schematically showing the construction of a motor vehicle steering system including ball joints according to one embodiment of the present invention.

FIG. 1 is a schematic diagram schematically showing the construction of a steering system 1 including ball joints according to the embodiment of the present invention for a motor vehicle. The motor vehicle steering system 1 includes a steering wheel 2 serving as a steering member, and a rack and pinion mechanism 3 serving as a steering mechanism for steering steerable vehicle wheels (not shown).

The steering wheel 2 is connected to the rack and pinion mechanism 3 via a steering shaft 4 and an intermediate shaft 5. The rotation of the steering wheel 2 is transmitted to the rack and pinion mechanism 3 via the steering shaft 4 and the intermediate shaft 5.

The rack and pinion mechanism 3 includes a pinion shaft 6 and a rack shaft 7. The pinion shaft includes a shaft portion 8 connected to the intermediate shaft 5 and a pinion gear 9 connected to a distal end of the shaft portion 8.

The rack shaft 7 is disposed transversely of the motor vehicle. The rack shaft 7 is formed with a rack gear 10. The pinion gear 9 and the rack gear 10 are meshed with each other. The rotation of the pinion shaft 6 is converted into the axial movement of the rack shaft 7 by the rack gear 10 and the pinion gear 9.

The rack shaft 7 extends through a tubular housing 11. Opposite end portions of the rack shaft project from the housing 11. The opposite end portions of the rack shaft 7 are each connected to one end of a tie rod 14 via an inner ball joint 12. An outer ball joint 13 is provided at the other end of the tie rod 14 (so-called tie rod end). Though not shown, the outer ball joint 13 is connected to the steerable vehicle wheel via a suspension including, for example, a coil spring and the like.

During a steering operation (steering wheel rotating operation), as described above, the rotation of the steering wheel 2 is transmitted to the pinion shaft 6 via the steering shaft 4 and the intermediate shaft 5, and the rotation of the pinion gear 9 is converted into the axial movement of the rack shaft 7 via the rack gear 10. At this time, the axial movement of the rack shaft 7 is transmitted to the tie rods 14 via the inner ball joints 12, and further transmitted to the suspensions via the outer ball joints 13.

Figure 2:
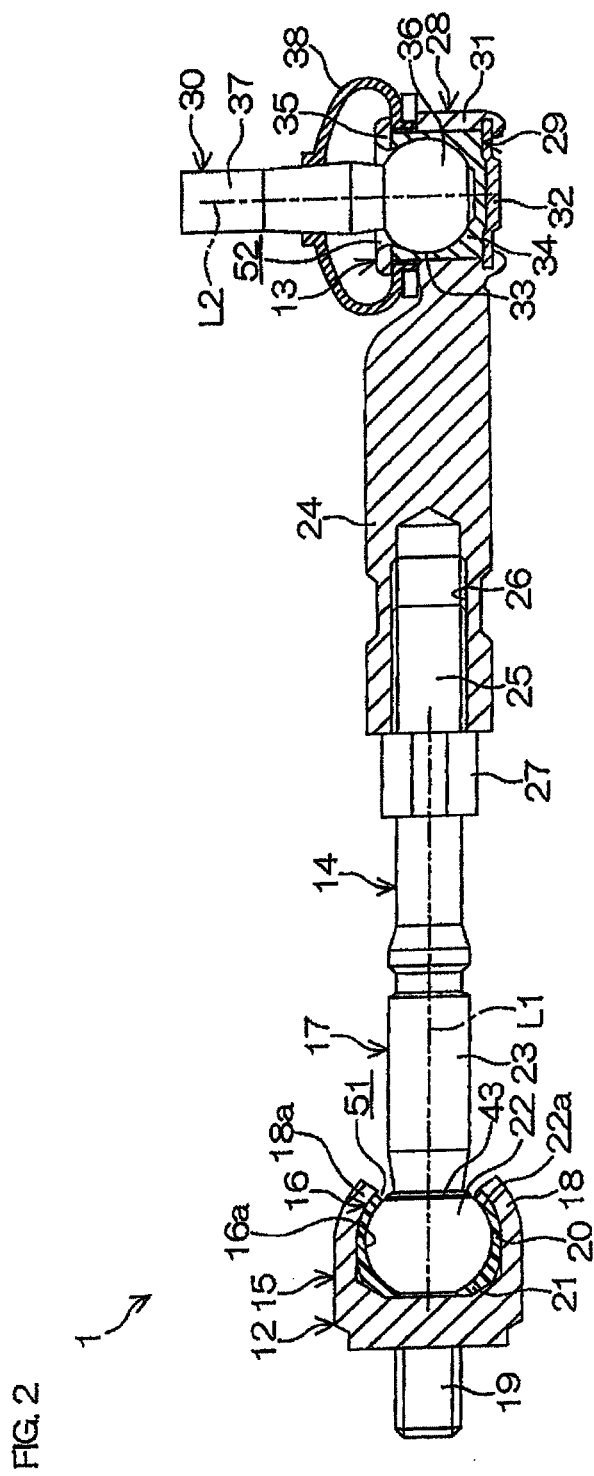
FIG. 2 is a partial sectional view of the motor vehicle steering system illustrated in FIG. 1 as having an inner ball joint and an outer ball joint.

FIG. 2 is a partial sectional view of the motor vehicle steering system 1 including the inner ball joints 12 and the outer ball joints 13.

The inner ball joints 12 each include a housing 15 connected to the end of the rack shaft 7 (see FIG. 1), and a resin sheet 16 and a ball stud 17 retained in the housing 15. The housing 15 includes a housing body 18 which retains the resin sheet 16 and the ball stud 17, and a connection portion 19 which is connected to the end of the rack shaft 7. The housing body 18 has a bottomed tubular shape having an opening 51. The housing body 18 includes an axially intermediate portion defined along a center axis thereof, and the intermediate portion has a constant inner diameter and a constant outer diameter. A rod 23 of the ball stud is inserted through the opening 51. An open end portion 18a of the housing body 18 (a right end portion of the housing 15 formed with the opening 51 in FIG. 2) is curved inward, and is smaller in inner diameter and outer diameter than the intermediate portion of the housing body 18. A part (a round head 22 to be described later) of the ball stud 17 and the resin sheet 16 retained in the housing body 18 are prevented from being withdrawn from the housing body 18 by the open end portion 18a of the housing body 18. Further, the resin sheet 16 has a cup shape, and includes a tubular peripheral wall 20 and a bottom portion 21 provided at one of opposite ends of the peripheral wall 20 (a left end of the peripheral wall 20 in FIG. 2). The resin sheet 16 is made of a synthetic resin, more specifically, a polyacetal (POM). The bottom portion 21 of the resin sheet 16 is located at a bottom of the housing body 18.

The ball stud 17 is a metal member, which integrally includes the round head 22 having a spherical outer peripheral surface and the rod 23 projecting from the round head 22. The center of the round head 22 is located on a center axis L1 of the rod 23. The round head 22 is covered with the resin sheet 16 in the housing body 18, and the rod 23 projects from the open end portion 18a of the housing body 18. The round head 22 is mostly covered with the resin sheet 16, except for a portion thereof adjacent to the rod 23.

The resin sheet 16 has an inner surface (contact surface) 16a configured so as to be fitted around an outer surface 22a of the round head 22. The round head 22 is enclosed in the housing body 18 with the intervention of the resin sheet 16. Grease (liquid or semisolid lubricant) G (see FIG. 5) is present between the resin sheet 16 and the round head 22. The round head 22 is slidable relative to the resin sheet 16. The ball stud 17 is pivotal about the roundhead 22 relative to the housing 15. Further, the ball stud 17 is rotatable about the center axis L1 of the rod 23. The ball stud 17 is pivotal within a predetermined plane according to the flexible deformation of the suspension. The pivot angle of the ball stud 17 is changed according to a change in the flexible deformation of the suspension.

The rod 23 includes a male thread portion 25 provided around a distal end portion (a right end portion in FIG.2) thereof. The male thread portion 25 is threadedly engaged with a female thread hole 26 formed in a connection shaft 24. With the male thread portion 25 in threaded engagement with the female thread hole 26, the connection shaft 24 is coaxially connected to the ball stud 17. The ball stud 17 is rotated to change the threaded engagement amount of the male thread portion 25 with respect to the female thread hole 26, whereby the toe angle of the steerable vehicle wheel is adjusted. With the rotational position (threaded engagement amount) of the ball stud 17 thus adjusted, a lock nut 27 is threadedly engaged with the male thread portion 25. The ball stud 17 and the connection shaft 24 are fixed with respect to each other by the lock nut 27.

The outer ball joints 13 each include a housing 28, and a resin sheet 29 and a ball stud 30 retained in the housing 28. The housing 28 includes a tubular member 31 retaining the resin sheet 29, and a plug plate 32 fixed to one of opposite ends of the tubular member 31 (a lower end of the tubular member 31 in FIG. 2) to close the one end of the tubular member 31. The other end (an upper end in FIG. 2) of the tubular member 31 is an open end. The tubular member 31 is provided, for example, integrally with the connection shaft 24. The tubular member 31 has an opening 52 provided at the other end thereof. A rod 37 of the ball stud 30 is inserted through the opening 52. The resin sheet 29 has a cup shape, and includes a tubular peripheral wall 33 and a bottom portion 34 provided at an end (a lower end in FIG. 2) of the peripheral wall 33. The resin sheet 29 is made of a synthetic resin, more specifically, a polyacetal (POM) The peripheral wall 33 of the resin sheet 29 is fitted on an inner peripheral surface of the tubular member 31, and the bottom portion 34 of the resin sheet 29 is opposed to the plug plate 32. The resin sheet 29 is retained between an annular flange 35 projecting inward from the other end (the upper end in FIG. 2) of the tubular member 31 and the plug plate 32. The inner diameter of the flange 35 is smaller than the outer diameter of a round head 36 (to be described later) of the ball stud 30. Thus, the roundhead 36 of the ball stud 30 and the resin sheet 29 are prevented from being withdrawn from the tubular member 31.

The ball stud 30 is a metal member which integrally includes the round head 36 having a spherical outer peripheral surface and the rod 37 projecting upward from the round head 36. The center of the round head 36 is located on a center axis L2 of the rod 37. The round head 36 is covered with the resin sheet 29 in the tubular member 31, and the rod 37 projects from the tubular member 31. The round head 36 is mostly covered with the resin sheet 29, except for a portion thereof adjacent to the rod 37. The round head 36 is retained in the housing 28 with the intervention of the resin sheet 29.

The inner surface of the resin sheet 29 is configured so as to be fitted around the outer peripheral surface of the round head 36. Grease is present between the resin sheet 29 and the round head 36. The round head 36 is slidable relative to the resin sheet 29. The ball stud 30 is pivotal about the round head 36 relative to the housing 28. Further, the ball stud 30 is rotatable about the center axis L2 of the rod 37.

A tubular boot 38 is attached to the housing 28 and the ball stud 30. One of opposite end portions of the boot 38 (a lower end portion of the boot 38 in FIG. 2) is fitted around the open end portion of the tubular member 31 and fixed to the tubular member 31. The other end portion (an upper end portion in FIG. 2) of the boot 38 is fitted around an intermediate portion of the rod 37 and fixed to the rod 37. The open end of the tubular member 31 is covered with the boot 38. This prevents foreign matter such as water and dust from intruding into the outer ball joint 13.

Figure 3:
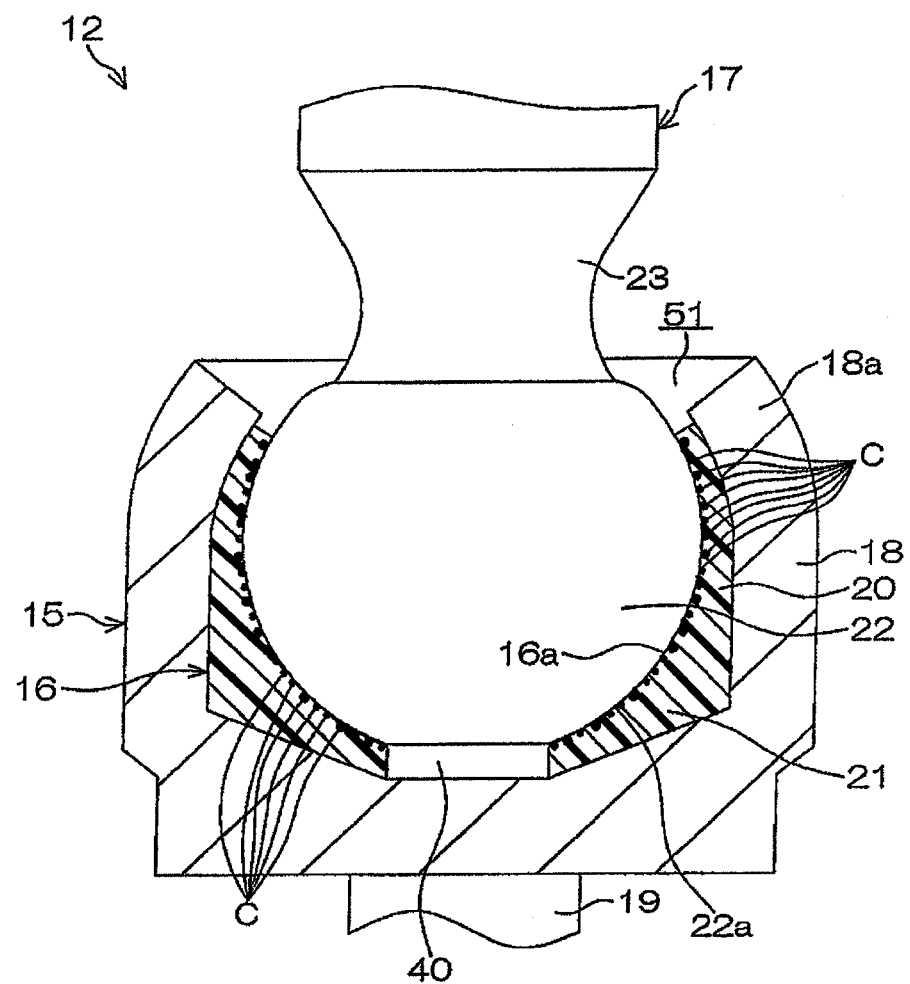
FIG. 3 is a partial sectional view of the inner ball joint shown in FIG. 1.

FIG. 3 is a partial sectional view of the inner ball joint 12. The inner ball joint 12 is sometimes referred to simply as "ball joint 12" in the following description.

The housing body 18 is a unitary member made of a metal such as steel and having a bottomed cylindrical shape. As will be described later, a swage die 45 (see FIG. 8) is pressed against the open end portion 18a (an upper end portion in FIG. 3) of the housing body 18 with the round head 22 and the resin sheet 16 inserted in the housing 15, whereby the open end portion 18a of the housing body 18 is swaged (swaging process) to be curved inward. Thus, the inner diameter and the outer diameter of the open end portion 18a of the housing body 18 are reduced as compared with the intermediate portion of the housing body 18.

Figure 4:
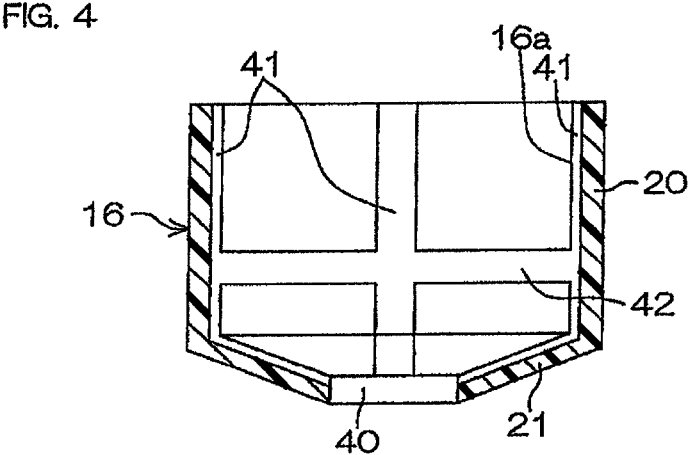
FIG. 4 is a sectional view of a resin sheet observed before the inner ball joint is assembled.

FIG. 4 is a sectional view of the resin sheet 16 observed before the inner ball joint 12 is assembled.

Before the assembling of the ball joint 12, the peripheral wall 20 of the resin sheet 16 is tubular with a constant inner diameter and a constant outer diameter. That is, as shown in FIG. 3, the peripheral wall 20 of the resin sheet 16 is held between the housing 15 and the round head 22 to be partly resiliently deformed by swaging the housing 15. Thus, the inner surface and the outer peripheral surface of the peripheral wall 20 are respectively fitted on the outer surface 22a of the round head 22 and the inner peripheral surface of the housing body 18. Further, the resin sheet 16 is pressurized by the swaging of the housing 15. As a result, the inner surface 16a of the resin sheet 16 presses the outer surface 22a of the round head 22 at a predetermined contact pressure. Therefore, when the ball stud 17 is pivoted or rotated, the round head 22 receives a sliding frictional resistance from the resin sheet 16. Accordingly, a predetermined torque should be applied to the ball stud 17.

As shown in FIGS. 3 and 4, the resin sheet 16 has a through-hole 40 provided at the bottom portion thereof to serve as a grease retainer. As shown in FIG. 4, the resin sheet 16 has a plurality of axial grooves 41 provided in the inner surface 16a thereof as extending axially along the center axis thereof, and an annular circumferential groove 42 provided in the inner surface 16a thereof as extending circumferentially thereof. The axial grooves 41 are equidistantly provided. The axial grooves 41 each extend from one edge to the other edge of the resin sheet 16, and communicate with the through-hole 40. Further, the circumferential groove 42 extends across the axial grooves 41 to communicate with the axial grooves 41. The axial grooves 41 and the circumferential groove 42 function as grease grooves for supplying the grease G (see FIG. 5) to the outer surface 22a of the round head 22 from the through-hole 40. A predetermined amount of graphite particles (solid lubricant particles) C are present over the entire inner surface 16a of the resin sheet 16 between the inner surface 16a of the resin sheet 16 and the round head 22. Usable examples of the graphite particles C include particles of natural graphites such as scaly graphite and earthy graphite, and particles of synthetic graphites.

Figure 5:
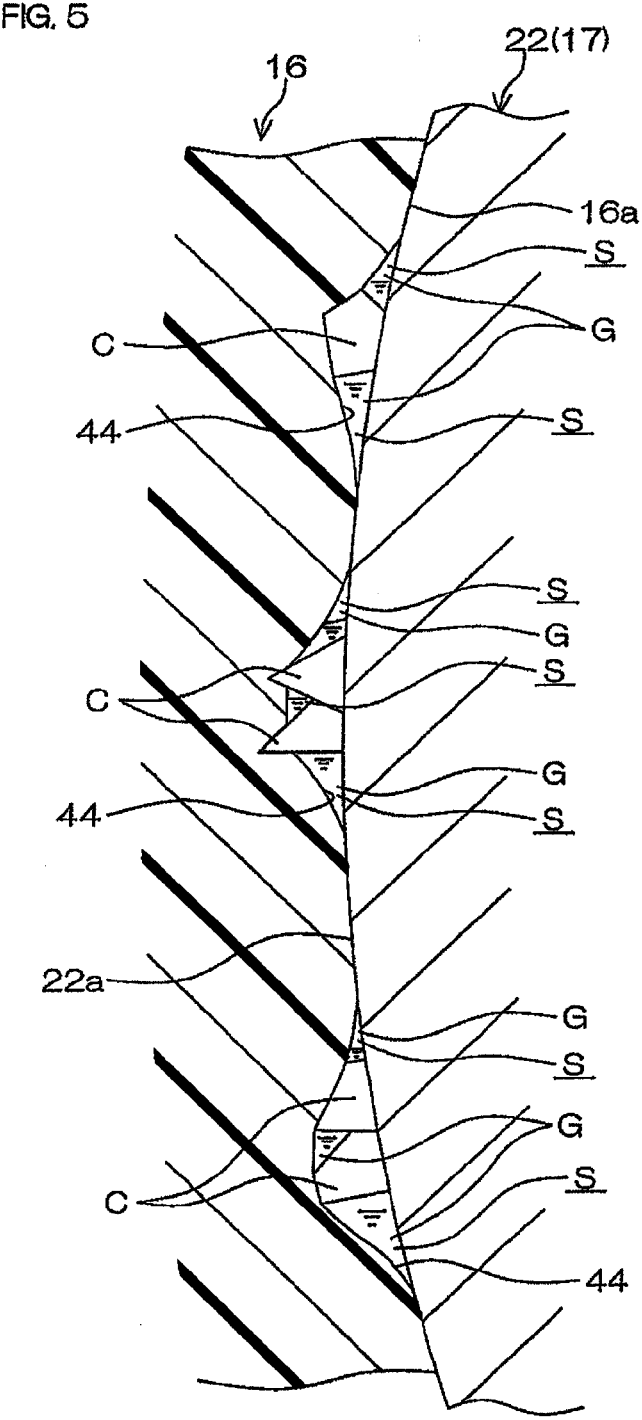
FIG. 5 is a partial sectional view illustrating, on a greater scale, a boundary between an outer surface of a round head and an inner surface of the resin sheet shown in FIG. 3.

FIG. 5 is a partial sectional view illustrating, on a greater scale, a boundary between the inner surface 16a of the resin sheet 16 and the outer surface 22a of the round head 22. The graphite particles C each have a generally spherical shape or a generally polygonal shape. The graphite particles C each have a particle diameter of several tens microns.

Since the resin sheet 16 is pressurized by the swaging of the housing 15, the graphite particles C present between the outer surface 22a of the round head 22 and a portion of the inner surface 16a of the resin sheet 16 not formed with the through-hole 40, the axial grooves 41 and the circumferential groove 42 are pressed against the outer surface 22a of the round head 22 by the resin sheet 16. The graphite particles C are also pressed against the inner surface 16a of the resin sheet 16 by the counter force of the pressure applied to the graphite particles C by the resin sheet 16. As a result, portions of the resin sheet 16 abutting against the graphite particles C are resiliently deformed, whereby depressions 44 are formed in and around inner surface portions of the graphite particle abutting portions of the resin sheet 16. The graphite particles C enter the depressions 44. Thus, minute gaps S are defined around the graphite particles C. Since the grease G is present between the inner surface 16a of the resin sheet 16 and the outer surface 22a of the round head 22, the grease G enters the gaps S defined around the graphite particles C. That is, the minute gaps S each function as a grease retainer. This makes it possible to properly provide the grease retainers over the entire inner surface 16a of the resin sheet 16 between the inner surface 16a of the resin sheet 16 and the outer surface 22a of the round head 22, whereby the lubrication between the round head 22 and the resin sheet 16 is properly maintained. This prevents the abrasion of the resin sheet 16, prolonging the service life of the ball joint.

Since the graphite particles C enter the depressions 44, the total area of outer peripheral surface portions of the graphite particles C contacting the inner surface 16a of the resin sheet is greater than the total area of outer peripheral surface portions of the graphite particles C contacting the outer surface 22a of the round head 22. Further, the graphite particles C generally each have one or more sharp edges, which may bite into the inner surface 16a of the resin sheet 16 due to the swaging (see FIG. 5). Therefore, when the round head 22 is moved (rotated) relative to the resin sheet 16 after the swaging, the graphite particles C are moved together with the resin sheet 16. Therefore, the depressions 44 can be fixedly provided in the inner surface 16a of the resin sheet 16. Thus, the gaps S each functioning as a grease retainer can be stably distributed over the inner surface 16a of the resin sheet 16.

Figure 6:
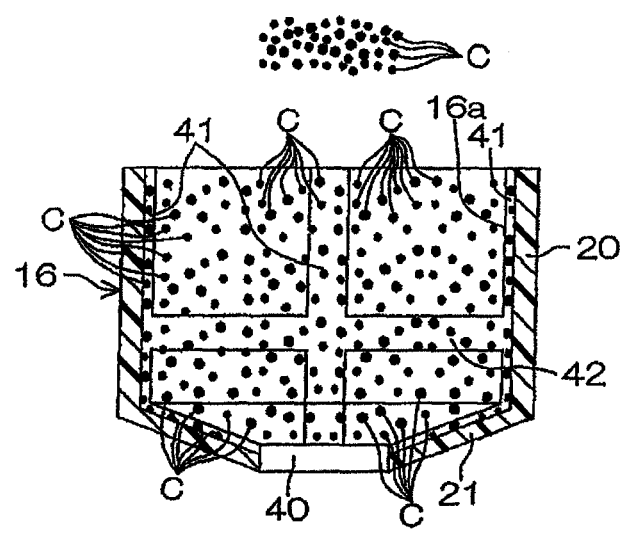
FIG. 6 is a sectional view showing a graphite particle dispersing step.
Figure 7:
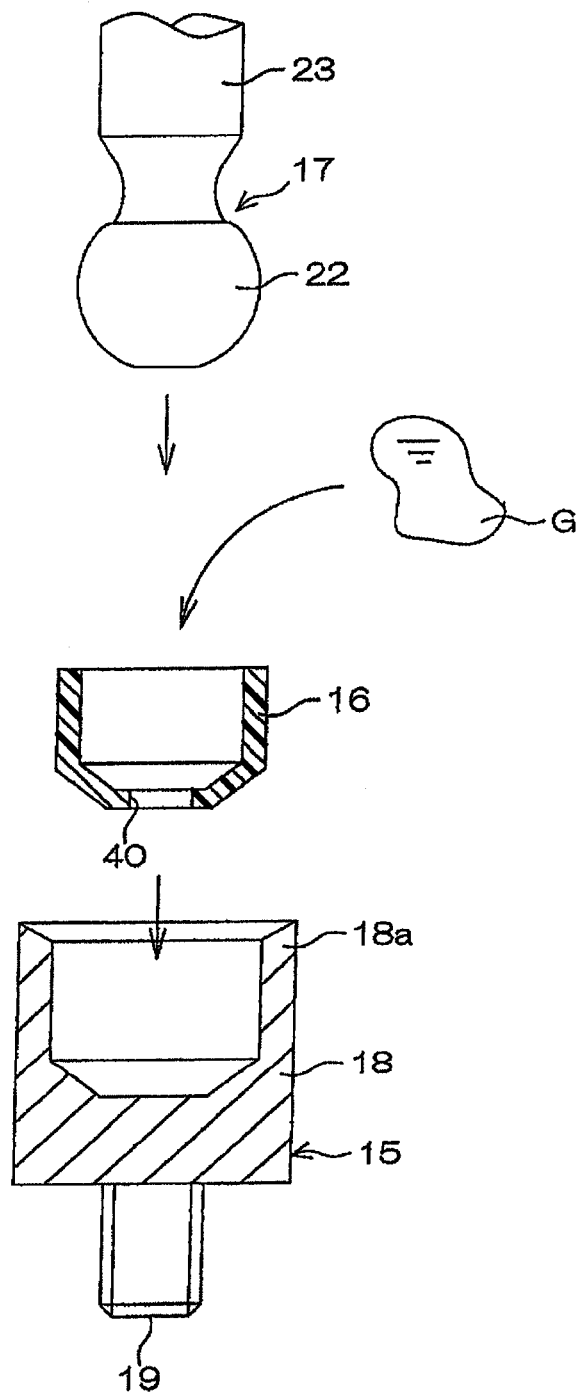
FIG. 7 is a sectional view showing an inserting step.
Figure 8:
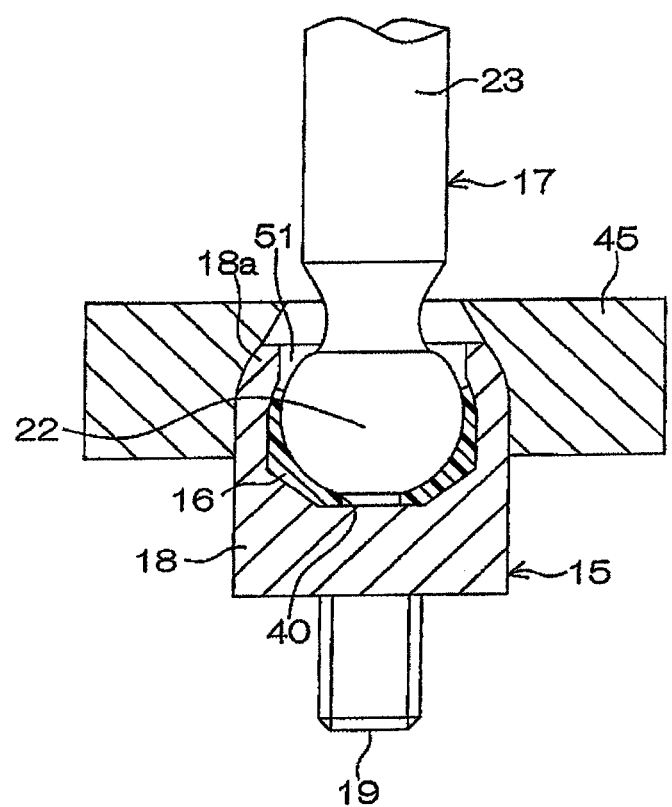
FIG. 8 is a sectional view showing a swaging step.

FIGS. 6, 7 and 8 are sectional views showing a method of producing the ball joint 12.

The method of producing the ball joint 12 includes a graphite particle dispersing step (solid lubricant dispersing step), a grease feeding step, a fit-in step (inserting step), and a swaging step.

First, graphite particles C are dispersed over the inner surface 16a of the resin sheet 16 (graphite particle dispersing step). More specifically, as shown in FIG. 6, a proper amount of graphite particles C are dispersed from above the resin sheet 16 to spread the graphite particles C over the entire inner surface 16a of the resin sheet 16. As shown in FIG. 6, the graphite particles C are dispersed to be generally evenly distributed over the entire inner surface 16a of the resin sheet 16, i.e., over the entire inner surface of the peripheral wall 20 and the entire inner surface of the bottom portion 21.

In turn, as shown in FIG. 7, the resin sheet 16 and the round head 22 of the ball stud 17 are fitted into the tubular housing 15 in this order (fit-in step).

In parallel to the fit-in step, the grease G is fed between the resin sheet 16 and the round head (grease feeding step). More specifically, the grease G is fed onto the resin sheet 16 after the resin sheet 16 is fitted in the housing 15 before the round head 22 is fitted in the resin sheet 16.

Thereafter, as shown in FIG. 8, the swage die 45 is pressed against the open end portion 18a of the housing body 18 to swage the open end portion 18a of the housing body 18 (swaging step). When the open end portion 18a of the housing body 18 is swaged, the resin sheet 16 is pressed against the round head 22, and the graphite particles C are embedded in the inner surface 16a of the resin sheet 16 by the counter force of the pressure applied to the graphite particles C by the resin sheet 16. The portions of the resin sheet abutting against the graphite particles C are resiliently deformed, whereby the depressions 44 are formed in and around the inner surface portions of the graphite particle abutting portions of the resin sheet 16. Thus, the gaps S each functioning as a grease retainer are defined by the depressions 44.

The graphite particles C held between the outer surface 22a of the round head 22 and the inner surface 16a of the resin sheet 16 may receive high pressure to be thereby each deformed from a generally spherical shape or a generally polygonal shape into a triangular shape, a rectangular shape or a flat shape as shown in FIG. 5. Some of the deformed graphite particles C have one or more sharp edges, which may bite into the inner surface 16a of the resin sheet 16. Of course, the deformation of the graphite particles C may be resilient deformation or plastic deformation.

In the method of producing the ball joint according to this embodiment, only the step of dispersing the graphite particles C is added to the conventional ball joint production method. This makes it possible to properly provide the grease retainers between the outer surface 22a of the round head 22 and the inner surface 16a of the resin sheet 16 without significant increase in the number of process steps.

While one embodiment of the present invention has thus been described, the present invention may be embodied in other ways.

In the embodiment described above, the graphite particles C are present between the round head 22 of the ball stud 17 and the resin sheet 16 in the inner ball joint 12 by way of example. Graphite particles C may be present between the round head 36 of the ball stud 30 and the resin sheet 29 in the outer ball joint 13.

In this case, the outer ball joint 13 can be produced in the following manner. As in the inner ball joint production method described above, the graphite particle dispersing step is performed as shown in FIG. 6. In turn, the resin sheet 29 and the round head 36 of the ball stud 30 are fitted into the tubular housing 28 in this order (fit-in step). In parallel to the fit-in step, the grease is fed between the resin sheet 29 and the round head 36 (grease feeding step). More specifically, the grease is fed onto the resin sheet 29 after the resin sheet 29 is fitted in the housing 28 before the round head 36 is fitted in the resin sheet 29. Thereafter, the plug plate 32 is inserted into one of opposite end portions of the housing 28 (a lower end portion of the housing 28 in FIG. 2), while the resin sheet 30 and the round head 36 are pressed toward the other end (an upper end in FIG. 2) of the housing 28 by the plug plate 32. Then, the one end portion (the lower end portion in FIG. 2) of the housing 28 is swaged to fix the plug plate 32. The resin sheet 29 is pressed against the round head 36 by the insertion of the resin sheet 29 and the round head 36. The graphite particles C are embedded in the inner surface of the resin sheet 29 by the counter force of a pressure applied to the graphite particles C by the resin sheet 29. Portions of the resin sheet 29 abutting against the graphite particles C are resiliently deformed, whereby depressions are formed in and around inner surface portions of the graphite particle abutting portions of the resin sheet 29. Thus, gaps are formed around the graphite particles C between the inner surface of the resin sheet 29 and the outer surface of the round head 36. The grease enters the gaps, which each function as a grease retainer.

The grease feeding method is not limited to that described above. More specifically, the grease may be applied to the inner surface of the resin sheet 16, 29 before the resin sheet 16, 29 is inserted into the housing 15, 28 or before the graphite dispersing step. Alternatively, grease which contains graphite particles dispersed therein may be fed between the inner surface of the resin sheet 16, 29 and the outer surface of the round head 22, 36.

In the embodiment described above, the graphite particles C are used as the solid lubricant particles by way of example. Alternatively, particles of carbon fiber may be used as carbon particles. Other examples of the solid lubricant include molybdenum dioxide and a tetrafluoroethylene resin (PTFE). Although the solid lubricant particles each have a particle diameter of several tens microns in the embodiment described above, a particle diameter which has little influence on the strength of the resin sheet when the depressions are formed in the resin sheet is less than about one fourth the thickness of the resin sheet, e.g., about 0.3 mm.

Although the resin sheet 16, 29 is made of the polyacetal by way of example, PEEK or a rubber material (elastomer) such as of a polyurethane or a polyester may be used as the material for the resin sheet 16, 29.

In the embodiment described above, the inner surface of the resin sheet 16, 29 is resiliently deformed by pressing the solid lubricant particles such as the graphite particles C against the resin sheet by way of example. Of course, the resin sheet 16, 29 may be plastically deformed by pressing the solid lubricant particles against the resin sheet.

In the embodiment described above, the inventive ball joint is used for the motor vehicle steering system 1 by way of example, but may be used for other devices. In the embodiment described above, the motor vehicle steering system 1 is adapted for a manual transmission motor vehicle by way of example but not by way of limitation. The motor vehicle steering system 1 may be a motor vehicle steering system such as of a hydraulic type or an electric motor type having an assist function, or a motor vehicle steering system of a steer-by-wire type.

It should be understood that various modifications maybe made within the scope of the present invention defined by the following claims.

What is claimed is:

1. A ball joint comprising:
   a ball stud having a round head provided at one end thereof;
   a resin sheet having a contact surface in contact with an outer surface of the round head and covering the outer surface of the round head to slidably support the round-head;
   a housing having an opening and accommodating the round head and the resin sheet; and
   grease provided between the outer surface of the round head and the contact surface of the resin sheet;
   wherein solid lubricant particles are provided between the outer surface of the round head and the contact surface of the resin sheet;
   wherein the solid lubricant particles are pressed against the contact surface, whereby depressions are formed in and around portions of the contact surface abutting against the solid lubricant particles to form gaps around the solid lubricant particles for retaining the grease.

2. The ball joint according to claim 1, wherein the solid lubricant particles are embedded in the contact surface to resiliently or plastically deform the contact surface to form the gaps.

3. The ball joint according to claim 2, wherein the solid lubricant particles are generally evenly distributed over the entire contact surface of the resin sheet.

4. The ball joint according to claim 3, wherein the solid lubricant particles include particles each having a particle diameter of several tens of microns.

5. The ball joint according to claim 4, wherein the solid lubricant particles each have an edge, which bites into the contact surface of the resin sheet.

6. The ball joint according to claim 4, wherein the solid lubricant particles are particles selected from the group consisting of graphite particles, carbon fiber particles, molybdenum dioxide particles and tetrafluoroethylene resin particles.

7. The ball joint according to claim 1, wherein the resin sheet has a through-hole provided at its bottom and serving as a grease retainer, a plurality of axial grooves provided in the contact surface of the resin sheet and communicating with the through-hole, and an annular circumferential groove provided in the contact surface of the resin sheet and communicating with the axial grooves.

8. The ball joint according to claim 7, wherein the resin sheet is a sheet made of a polyacetal.

* * * * *